Figure 4:
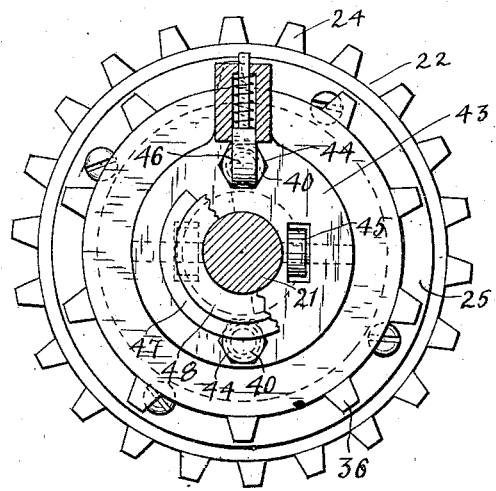

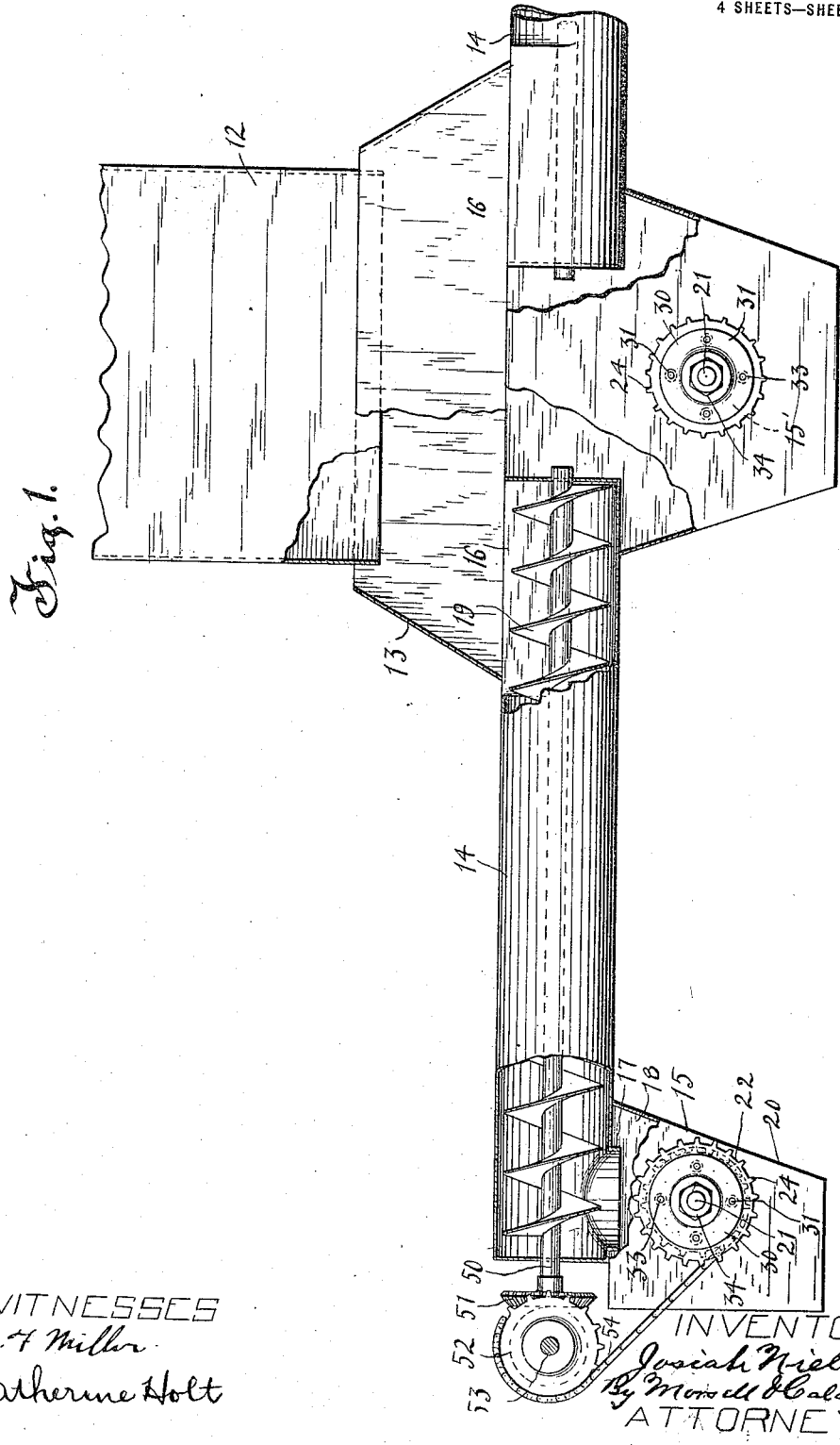

J. NIELD.
AUTOMATIC CLUTCH MECHANISM.
APPLICATION FILED NOV. 10, 1913.
1,183,584.
Patented May 16, 1916.
4 SHEETS—SHEET 2.
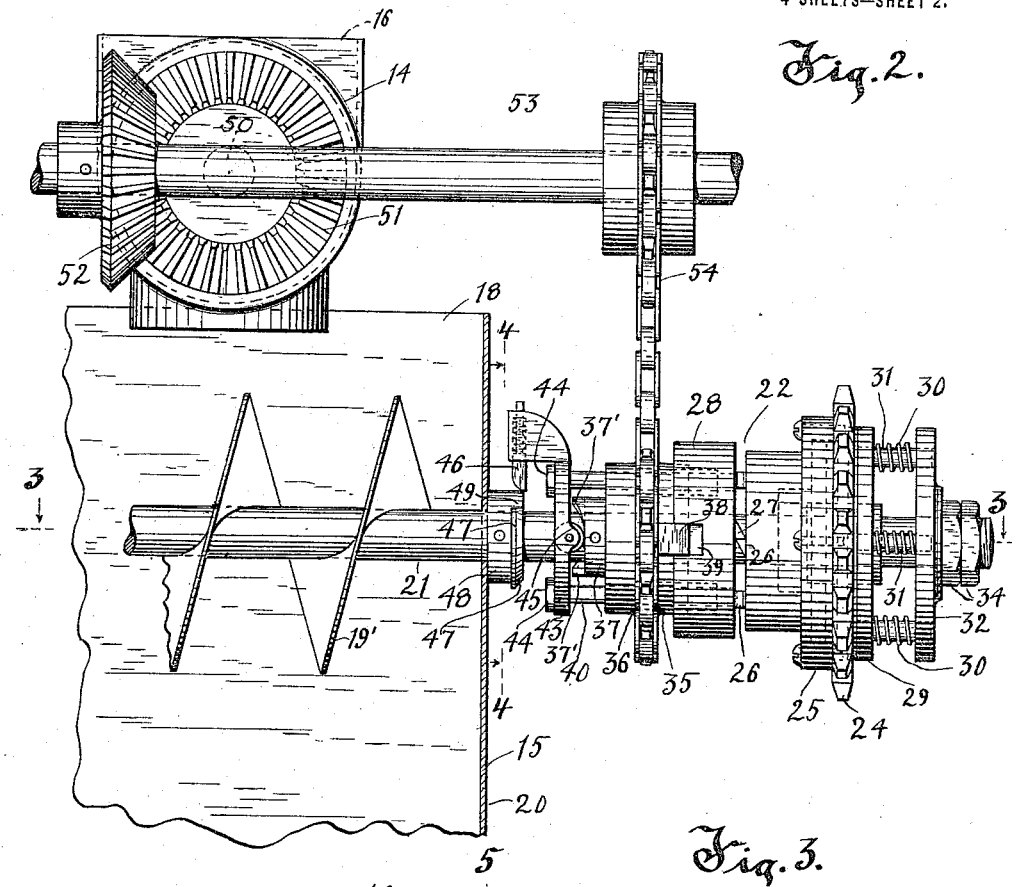
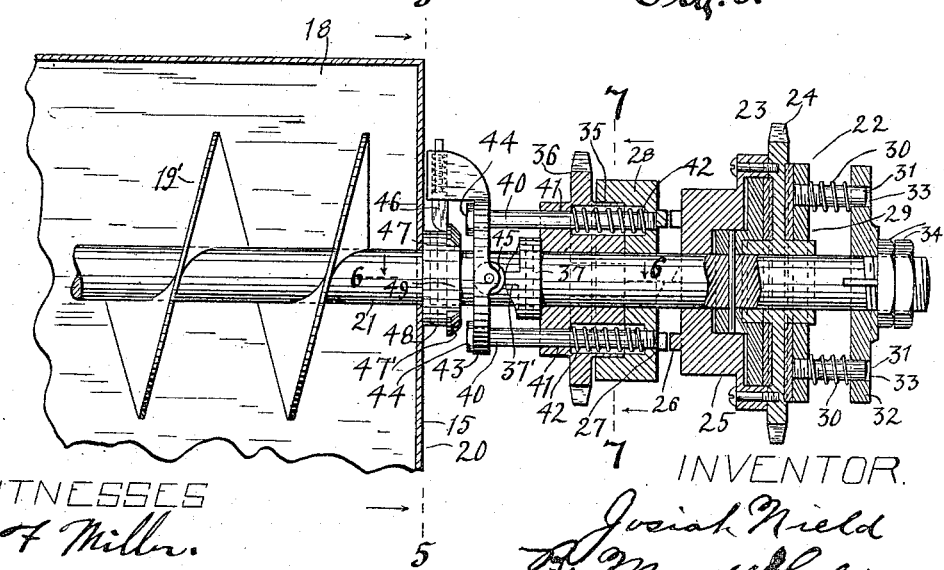
WITNESSES
C. F. Miller
Katherine Holt
INVENTOR.
Josiah Nield
By Morsell & Caldwell
ATTORNEYS.

J. NIELD.
AUTOMATIC CLUTCH MECHANISM.
APPLICATION FILED NOV. 10, 1913.

1,183,584.

Patented May 16, 1916.
4 SHEETS—SHEET 3.

WITNESSES.
C. F. Miller.
Katherine Holt.

INVENTOR.
Josiah Nield
By Morsell & Caldwell
ATTORNEYS.

J. NIELD.
AUTOMATIC CLUTCH MECHANISM.
APPLICATION FILED NOV. 10, 1913.
1,183,584.
Patented May 16, 1916.
4 SHEETS—SHEET 4.
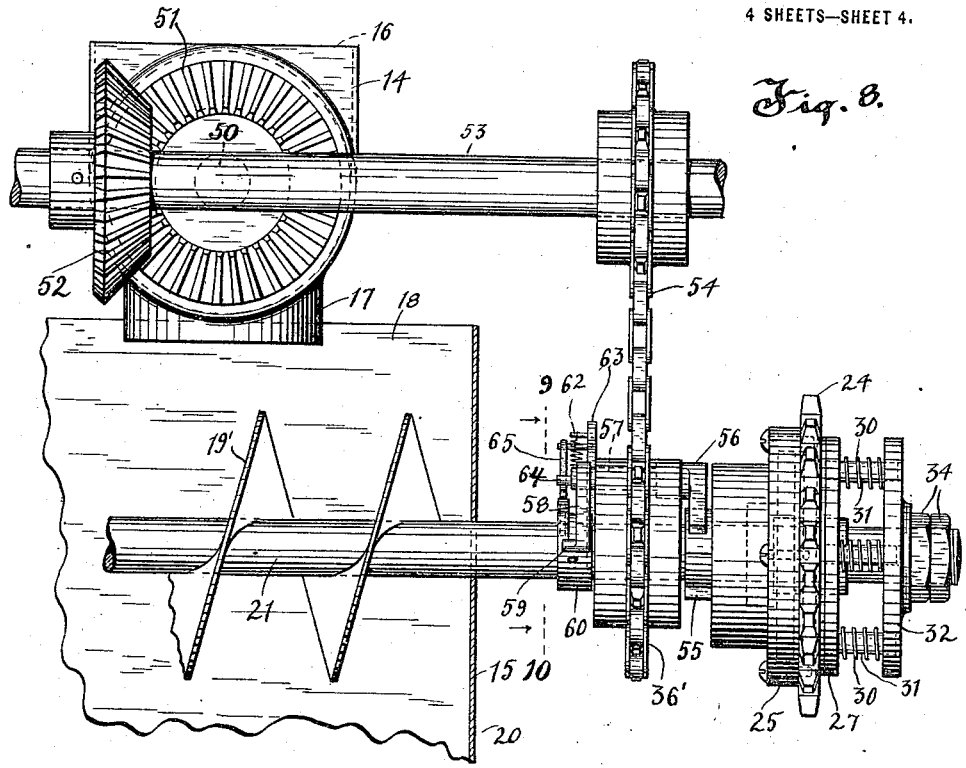
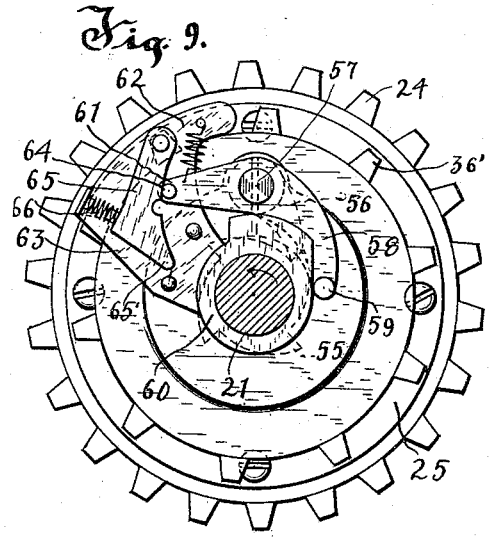
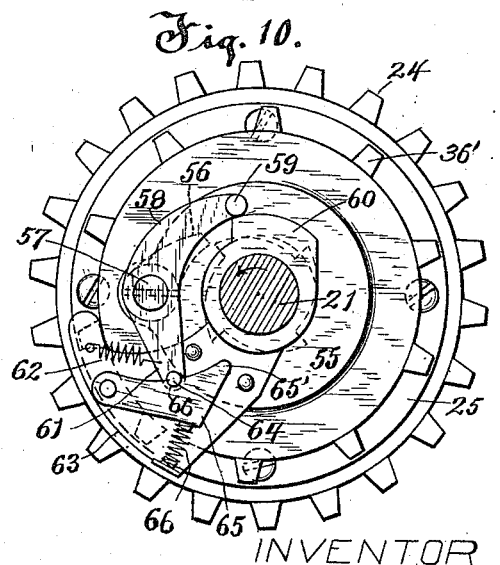
WITNESSES.
G. F. Miller.
Katherine Holt.
INVENTOR
Josiah Nield
By Morsell & Caldwell
ATTORNEYS.

UNITED STATES PATENT OFFICE.

JOSIAH NIELD, OF MILWAUKEE, WISCONSIN, ASSIGNOR, BY MESNE ASSIGNMENTS, TO W. & T. AVERY LTD., OF BIRMINGHAM, ENGLAND.

AUTOMATIC CLUTCH MECHANISM.

1,183,584. Specification of Letters Patent. Patented May 16, 1916.

Application filed November 10, 1913. Serial No. 800,105.

*To all whom it may concern:*

Be it known that I, JOSIAH NIELD, a subject of the King of England, and resident of Milwaukee, in the county of Milwaukee and State of Wisconsin, have invented new and useful Improvements in Automatic Clutch Mechanism, of which the following is a description, reference being had to the accompanying drawings, which are a part of this specification.

This invention relates to improvements in automatic clutch mechanism more particularly adapted for use with automatic conveyers for intermittently conveying material such as coal from automatic scales to automatic stokers or other receiving means.

In the ordinary use of automatic scales and stokers the material is first passed through the scale and is then conveyed to the stokers or other places of disposition usually by spiral conveyers consisting of a tube or trough having a spirally trending rotary member mounted therein. It has been found in use that when the conveyers were used for conveying coal intermittently that the continued rotation of the conveyer after the discharge of the material had been retarded or checked, would tend to pack the material to such an extent before it stopped as to preclude the possibility of automatically starting again.

It is one of the objects of the present invention to overcome this objectionable feature and provide a clutch mechanism which will automatically stop when the material within the conveyer tube is retarded or checked to a predetermined extent and which will automatically start again when the retarding influence is reduced.

A further object of the invention is to provide an automatic clutch mechanism in which the working parts may be adjusted to respond to any degree of retardation desired.

A further object of the invention is to provide an automatic clutch mechanism having means for positively locking the parts in inoperative positions during the periods of rest.

A further object of the invention is to provide an automatic clutch mechanism of simple construction, which is strong and durable and is well adapted for the purpose desired.

With the above and other objects in view the invention consists of the improved automatic clutch mechanism and its parts and combinations as set forth in the claims and all equivalents thereof.

Figure 5:
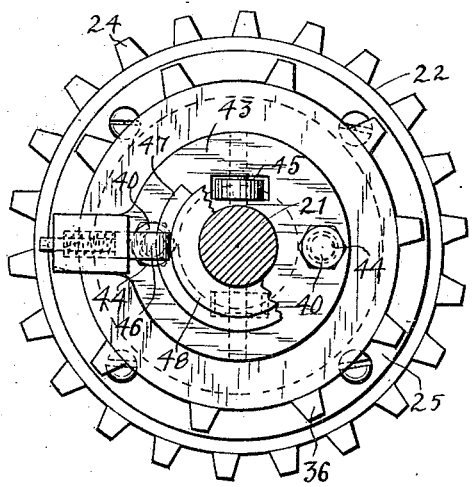
Figure 6:
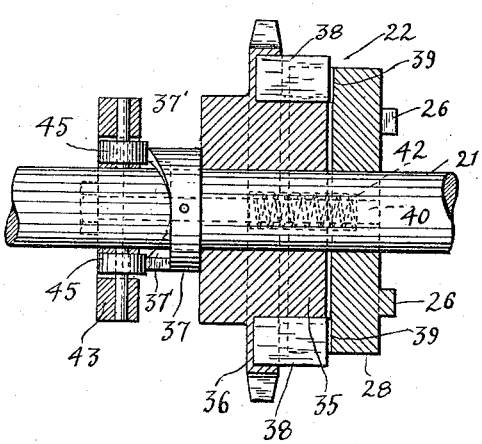
Figure 7:
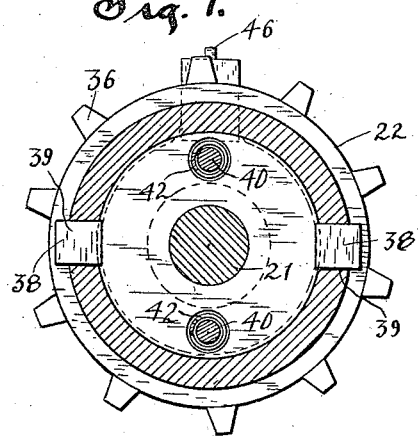

In the accompanying drawings in which the same reference characters indicate the same parts in all of the views: Figure 1 is a front view of the improved automatic clutch mechanism in connection with an automatic conveyer, parts being broken away to show interior construction; Fig. 2 is a side view of a portion thereof taken at right angles to Fig. 1, a part being in section; Fig. 3 is a horizontal sectional view of one of the automatic clutches of the conveyer taken on line 3—3 of Fig. 2; Fig. 4 is a transverse sectional detail view taken on line 4—4 of Fig. 2; Fig. 5 is a similar view taken on line 5—5 of Fig. 3; Fig. 6 is a longitudinal sectional view taken on line 6—6 of Fig. 3; Fig. 7 is a transverse sectional view taken on line 7—7 of Fig. 3; Fig. 8 is a side view of a modified form of clutch mechanism; Fig. 9 is a transverse sectional view thereof taken on line 9—10 of Fig. 8; and Fig. 10 is a similar view with the parts in unclutched positions.

Referring to the drawings the numeral 12 indicates the discharge spout of an automatic weighing scale, 13 a receiving hopper and 14 a number of conveyer tubes extending in different directions therefrom and which convey material from the receiving hopper to the lower conveyers 15 connected thereto and extending beneath the outer ends of the conveyers 14. The inner ends of the upper conveyers 14 are provided with inlet openings 16 to receive the material from the scale hopper and the outer ends of said conveyers have discharge openings 17 extending above the open receiving ends 18 of the lower conveyers 15. The said conveyers 15 move the material to any receiving means (not shown) desired.

A conveyer 15' is connected directly to the receiving hopper 13 medially between the inner ends of the ordinary conveyers 14 and below the horizontal plane thereof so that material discharged from the scale hopper 12 and which does not enter the upper conveyers will fall into the lower conveyer 15' and be moved thereby. The material falling into the upper conveyers is moved by the spiral members 19 positioned therein.

As the different lower conveyers are of similar construction and operation a description of one will be sufficient to clearly explain the invention. The tube or trough 20 of each automatic conveyer is also provided with spiral members 19' and the driving shaft 21 of this member is journaled in and extends through one end of the tube 20 and carries an automatic clutch mechanism 22 on its outer end portion. A friction disk 23 pinned to the shaft is positioned to be engaged by the inner face of a driving sprocket wheel 24 which is loosely journaled on the shaft. The sprocket wheel is provided with a detachable hub member 25 which is bolted to one side of the wheel and extends over and covers the friction disk 23. The inner face of this hub is provided with laterally projecting teeth 26 which are engaged by corresponding teeth 27 projecting from the outer face of the reciprocal collar 28 which is also loosely mounted on the shaft. The outer face of the sprocket wheel is also frictionally engaged by an adjustable friction ring 29 which is yieldingly held against the sprocket wheel by coiled springs 30, and these springs surround pins 31 projecting from the ring and are interposed between the ring and an adjustable plate 32 splined on the outer end of the shaft 21. The plate 32 is slidably splined on the shaft and is provided with openings 33 through which the pins 31 slidably extend. The frictional engagement between the sprocket wheel 24 and the frictional members 23 and 29 is adjusted by means of the nuts 34 threaded on the end of the shaft 21 and bearing against the plate 32.

The reciprocal collar 28 is slidably mounted and journaled on the shaft 21 and slidably mounted upon the outer hub 35 of a supplemental sprocket wheel 36 journaled on the shaft 21. The sprocket 36 on its inner face bears endwise against a cam collar 37 fixedly mounted on the shaft and this collar is provided with cam portions 37' extending inwardly and circumferentially around the inner edge of the collar and diametrically opposite each other on the shaft. The reciprocal collar 28 and the supplemental sprocket 36 are locked rotatively together by blocks 38 which project from the said sprocket and enter recesses 39 formed in the inner face of the reciprocal collar. This construction permits the collar to reciprocate freely on the hub but binds the two parts together rotatively. Bolts 40 fixedly connected to the collar 28 extend therefrom and loosely through openings 41 in the hub of the sprocket 36 in lines parallel to the shaft 21 and on opposite sides thereof. The openings 41 are in part of sufficient size to receive coiled springs 42 which surround the bolts 40 and are interposed between the sprocket 36 and the collar 28. These springs serve to normally force the collar outwardly and the teeth 27 of the collar into engagement with the teeth 26 of the detachable hub 25 and lock the collar and the hub rotatively together.

The outer ends of the bolts 40 extend through a holding collar 43 and are provided with heads 44 which bear against the collar and connect the parts together. The holding collar is provided with anti-friction rollers 45 which ride on the cam portions of the cam collar 37 and with a spring actuated bolt 46 which is adapted to engage the partly annular shoulder 47 of the holding sleeve 48. The holding sleeve 48 is fixedly mounted on and turns with the shaft 21 and the shoulder 47 extends around the periphery of said sleeve and its front edge 47' is beveled to permit the lower rounded end of the spring bolt to snap thereover. The space 49 between the ends of the shoulder 47 permits the spring bolt to disengage the shoulder when turned into register therewith. The parts of the mechanism are so spaced with relation to each other that when the rollers pass off the cams the teeth of the reciprocal collar will engage the teeth of the detachable hub and the spring bolt will extend just in front of the beveled edge of the annular shoulder.

The spiral member 19 of the tube 14 is mounted on a shaft 50 and this shaft extends through the outer end of the tube and is provided with a beveled gear 51 which is in mesh with another bevel gear 52 mounted on a counter shaft 53. The counter shaft 53 extends at right angles to the shaft 50 and in a line parallel to the shaft 21 and has a sprocket wheel and chain connection 54 with the sprocket wheel 36 and is driven thereby. The counter shaft 53 may be extended as desired to rotate other conveyers. The sprocket wheel 24 is driven from a source of power not shown.

In the operation of the clutch and assuming that the parts are in the positions shown in Fig. 2, the driven sprocket is locked to the driving sprocket wheel and will be driven thereby. Now if the material being moved in the lower conveyer is checked or retarded to an extent to overcome the frictional engagement of the driving sprocket with the friction members the said sprocket wheel will turn on the shaft and the holding collar will ride upon the cams and move the teeth of the reciprocal collar out of engagement with the teeth of the hub and also snap the spring bolt into engagement with the locking shoulder of the holding sleeve. In this position (shown in Fig. 2) the driven sprocket will be disengaged and the upper conveyer will stop and the driving sprocket wheel will continue to revolve on the driving shaft between the frictional members. As the check or retarding influence is removed or lessened the frictional contact between the friction members and the driving sprocket will cause the driving shaft to rotate and in rotating the cams will disengage the rollers of the holding collar and when the space of the holding sleeve turns into register with the spring bolt the holding collar will be moved to normal position with the teeth of the detachable hub and the reciprocal collar engaging each other and the upper conveyers connected to the driven shaft will be positively driven in the manner before described as well as the lower conveyers which are connected directly to the drive shaft.

In the form shown in Figs. 8, 9 and 10 the manner of automatically locking the driven sprocket to the driving sprocket has been modified and will now be explained. The hub 25 of the driving sprocket 24 is provided with a projecting portion having ratchet teeth 55 formed on its periphery which are engaged by a pawl 56 carried by the driven sprocket wheel 36'. This pawl is fixedly connected to a short rock shaft 57 which extends through the hub of the sprocket 36' and on its opposite end carries a trip lever 58. One end 59 of the lever is positioned in the path of movement of a cam collar 60 mounted on and turning with the shaft, and the other end 61 of the lever has a yielding connection, by means of a spring 62, with a plate 63 fastened to and projecting radially from the hub of the driven sprocket 36'. The spring serves to normally hold the lever bearing against the face of the cam and the pawl in engagement with the ratchet teeth. The spring connected end of the lever is provided with a laterally projecting pin portion 64 which is engaged by a locking arm 65 when the pawl is swung out of engagement with the ratchet teeth by the engagement of the opposite end of the lever with the cam. The locking arm is pivoted to the plate and is provided with a notch or recess 66 into which the pin portion 64 slides when the cam swings the pawl out of engagement with the ratchet teeth and this notched portion holds the pawl in disengaged position until the arm is swung outwardly by the cam, the arm being provided with an extension 65' which swings into the path of movement of the cam when the pin portion enters the notch. A coiled compressive spring 66 connected to the arm and to the plate serves to yieldingly hold the inner curved edge of the arm being against the pin portion of the lever. In the operation of this modified portion of the automatic clutch the retardation of the shaft will cause the lever to ride up the highest part of the cam and disengage the pawl from the ratchet teeth and in this position the lever will be locked to the arm in its upper position and the upper conveyer driven by the driven sprocket wheel will stop. Now as soon as the retarding influence is removed from the driving shaft the shaft will revolve and the cam mounted thereon will engage the arm and release the lever and the pawl will swing into engagement with the ratchet teeth and the driven sprocket will be again positively driven by the driving sprocket wheel.

From the foregoing description it will be seen that the automatic clutch mechanism is well adapted to perform the function described.

What I claim as my invention is:

1. An automatic clutch mechanism, comprising a conveyer shaft, a driving member frictionally connected thereto, a driven member mounted on the shaft and having a driving connection with the driving member, and means for disengaging the connection between the two members when the rotation of the shaft is retarded to a predetermined extent.

2. An automatic clutch mechanism, comprising a conveyer shaft, a driving wheel mounted thereon and having a frictional driving connection therewith, a driven wheel mounted on the shaft and releasably and rotatively connected to the driving wheel, and means for disengaging the connection between the two wheels when the rotation of the shaft is retarded to a predetermined extent.

3. An automatic clutch mechanism, comprising a conveyer shaft, a driving wheel frictionally connected thereto, a driven wheel mounted on the shaft and having a positive driving connection with the driving wheel, and means for disengaging the connection between the two wheels when the rotation of the shaft is retarded to a predetermined extent and to cause the engagement of said driving connection when the retardation is reduced.

4. An automatic clutch mechanism, comprising a conveyer shaft, a driving wheel journaled on the shaft, friction members mounted on the shaft and engaging the driving wheel to frictionally connect the wheel to the shaft, a driven wheel loosely mounted on the shaft, means for positively locking the two wheels rotatively together, and means for disengaging the locking connection and for locking the parts in disengaged positions while the rotation of the shaft is retarded to a predetermined extent.

5. An automatic clutch mechanism, comprising a conveyer shaft, a driving wheel journaled on the shaft, friction members mounted on the shaft and engaging the driving wheel to frictionally connect the wheel to the shaft, a driven wheel loosely mounted on the shaft, a reciprocal member carried by the driven wheel and having means for positively engaging the driving wheel, a cam member mounted on the shaft for controlling the movement of the reciprocal member, and means for positively locking the reciprocal member in its disengaged position.

6. An automatic clutch mechanism, comprising a conveyer shaft, a pair of friction members mounted thereon, a driving wheel interposed between the two members and frictionally engaged thereby, a driven wheel journaled on the shaft, a reciprocal member carried by the driven wheel, the driving wheel and the reciprocal member having teeth which normally engage each other, a cam mounted on the shaft, a holding sleeve mounted on the shaft and having a shouldered portion extending around a part of its periphery, a holding collar carried by the reciprocal member and engaging the cam and having a yielding portion which engages the shoulder of the holding sleeve, and means for yieldingly holding the reciprocal member in a position so that its teeth will engage the teeth of the driving wheel while the shaft is being rotated by the driving wheel.

In testimony whereof, I affix my signature, in presence of two witnesses.

JOSIAH NIELD.

Witnesses:
M. HAND,
G. SIMMERLING.

Copies of this patent may be obtained for five cents each, by addressing the "Commissioner of Patents, Washington, D. C."